United States Patent [19]

Lapeyre

[11] Patent Number: 4,934,518
[45] Date of Patent: * Jun. 19, 1990

[54] MODULAR CENTER DRIVE CONVEYOR BELT

[75] Inventor: James M. Lapeyre, New Orleans, La.

[73] Assignee: The Laitram Corporation, Harahan, La.

[ * ] Notice: The portion of the term of this patent subsequent to Dec. 3, 2002 has been disclaimed.

[21] Appl. No.: 352,641

[22] Filed: May 12, 1989

Related U.S. Application Data

[63] Continuation of Ser. No. 277,512, Nov. 28, 1988, abandoned, which is a continuation of Ser. No. 52,845, May 21, 1987, abandoned, which is a continuation of Ser. No. 179,523, Aug. 19, 1990, Pat. No. 4,832,187.

[51] Int. Cl.$^5$ ............................................. B65G 17/06
[52] U.S. Cl. ............................................................ 198/853
[58] Field of Search ........................ 198/834, 851-853; 474/156, 157, 206, 207, 212, 219, 223, 224, 228, 232, 234, 235; 24/31 H, 33 B, 33 P, 33 K

[56] References Cited

U.S. PATENT DOCUMENTS

| | | | |
|---|---|---|---|
| 2,000,499 | 5/1935 | Roland | 474/157 X |
| 2,391,485 | 12/1945 | Simmons | 474/224 X |
| 3,066,549 | 12/1962 | Benjamin | 198/853 X |
| 3,641,831 | 2/1972 | Palmaer | 198/853 |
| 3,870,141 | 3/1975 | Lapeyre et al. | 198/853 |
| 4,051,949 | 10/1977 | Lapeyre | 198/853 |
| 4,159,763 | 7/1979 | Kewley et al. | 198/853 |
| 4,213,527 | 7/1980 | Lapeyre et al. | 198/853 |
| 4,556,142 | 12/1985 | Lapeyre | 198/853 |
| 4,676,368 | 6/1987 | Damkjar | 198/853 |
| 4,688,670 | 8/1987 | Lapeyre | 198/853 |
| 4,730,724 | 3/1988 | Poerink | 198/834 |
| 4,821,872 | 4/1989 | Lapeyre | 198/853 |
| 4,832,187 | 5/1989 | Lapeyre | 198/851 |

Primary Examiner—Joseph E. Valenza
Attorney, Agent, or Firm—Weingarten, Schurgin, Gagnebin & Hayes

[57] ABSTRACT

A conveyor belt composed of a plurality of interconnected modules, each of identical construction and end to end mateable. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket.

88 Claims, 4 Drawing Sheets

MODULAR CENTER DRIVE CONVEYOR BELT

This application is a continuation of application Ser. No. 07/277,512, filed Nov. 28, 1988, abandoned, which is a continuation of application Ser. No. 07/052,845, filed May 21, 1987, abandoned, which is a continuation of application Ser. No. 06/179,523, filed Aug. 19, 1980, U.S. Pat. No. 4,832,187.

FIELD OF THE INVENTION

This invention relates to conveyors and more particularly to a modular conveyor belt composed of interconnected like modules.

BACKGROUND OF THE INVENTION

A module conveyor belt is the subject of U.S. Pat. No. 3,870,141 and which comprises modules pivotally connected to one another, each module being molded as a single unit, preferably of a plastic material. Each module includes a number of parallel spaced links having end sections with aligned holes for accommodation of pivot rods, and intermediate sections joined by integral cross members to form a rigid supporting grid. The modules are end to end mateable; that is, a module is capable of being connected to or mate with a like module at its ends irrespective of which end of which module is employed. The conveyor module thus formed is simple and inexpensive to manufacture and assemble into a conveyor belt or the like of any width and length.

In U.S. Pat. No. 4,051,949 there is shown a variant of the above-described conveyor belt and which is operative to transport articles to and from a conveyor comb. This conveyor comprises modules similar to those shown in U.S. Pat. No. 3,870,141 and includes on each module a plurality of links or ribs which are upwardly extending to provide an upper surface above the surface of the cross members to provide axial passageways into which the teeth of the conveyor comb can extend while the belt is in motion.

In copending application Ser. No. 013,165, filed Feb. 25, 1979, entitled Link Chain Belt, there is shown a link structure in which a driving tooth protrudes from the link at a position intermediate the pivot axes at the link ends. The location of the driving tooth midway between the pivot axes and the configuration of the driving tooth surfaces, when employed in conjunction with an associated sprocket wheel configuration, exhibits substantially low scrubbing action and small chordal action. Scrubbing action is known in relation to chain belts wherein the link teeth and sprocket teeth engage one another with a scrubbing or rubbing contact. Chordal action in chain drives is also known and comprises a vibratory motion of the chain as it engages the sprocket wheel.

SUMMARY OF THE INVENTION

In brief, the present invention provides a conveyor belt which is similar to and an improvement over the aforesaid structures. The novel belt is composed of a plurality of interconnected modules, each of identical construction and which are symmetrical such that any linking end of a module can be connected to any linking end of an adjacent module. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket. Aligned openings are provided in the link ends for accommodation of pivot rods by which modules are linked together. Retaining pins are inserted in the module ends for retention of the pivot rods.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
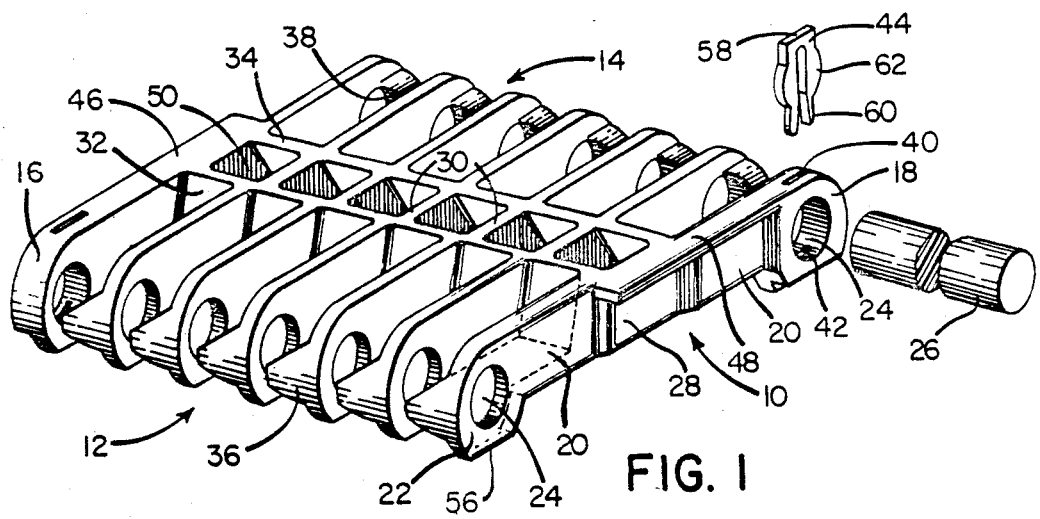
FIG. 1 is a perspective view of a conveyor module embodying the invention.
Figure 2:
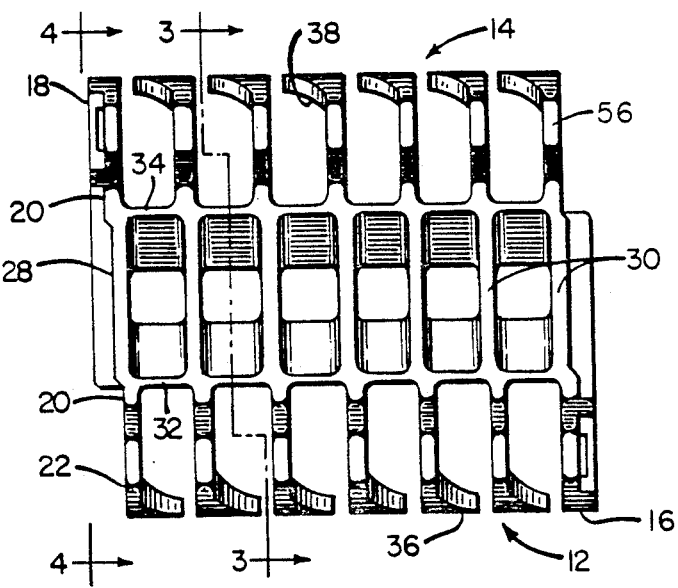
FIG. 2 is a bottom view of the module of FIG. 1.
Figures 3, 4:
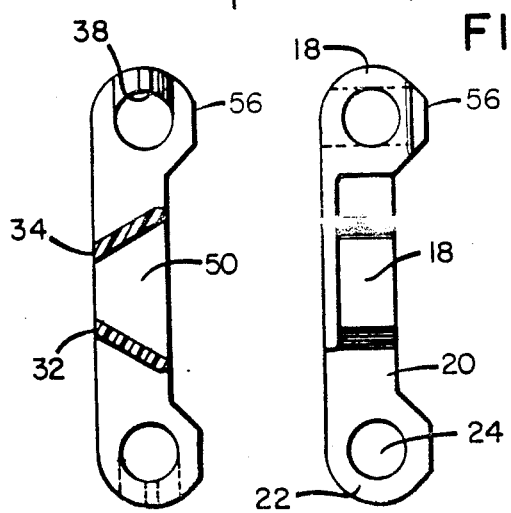
FIG. 3 is a sectional view taken along lines 3—3 of FIG. 2.
FIG. 4 is a sectional view taken along lines 4—4 of FIG. 2.
Figure 5:
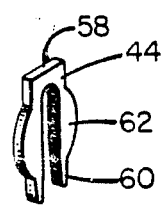
FIG. 5 is a perspective view of a retaining pin useful in the invention.

Referring to the drawing and particularly FIGS. 1-4, there is shown a module 10 which is interconnected with like modules to produce a modular conveyor belt in accordance with the invention. Each module 10 is formed as an integral unitary structure of plastic material by well-known injection molding or other molding processes. Each module 10 includes a multiplicity of elongated parallel spaced link elements, the length of the module being equal to the length of the link elements, and the width of the module being determined by the number of link elements. The module includes a first plurality of link ends 12 and a second plurality of link ends 14, each of which is identical in construction except for diagonally opposite outer link ends 16 and 18. Each link end 12 and 14 includes a section 20 terminating in an end section 22 which encircles an opening 24. The openings 24 of the respective link ends are aligned along a common axis and accommodate a pivot rod 26 inserted therethrough. The link ends 12 and 14 are joined by an intermediate section 28 which is of gridlike structure composed of longitudinal sections 30 and transverse sections 32 and 34. The intermediate sections 30 are parallel to and laterally offset from the link ends. The intermediate sections 32 and 34 are angled toward the respective link ends.

Figure 6:
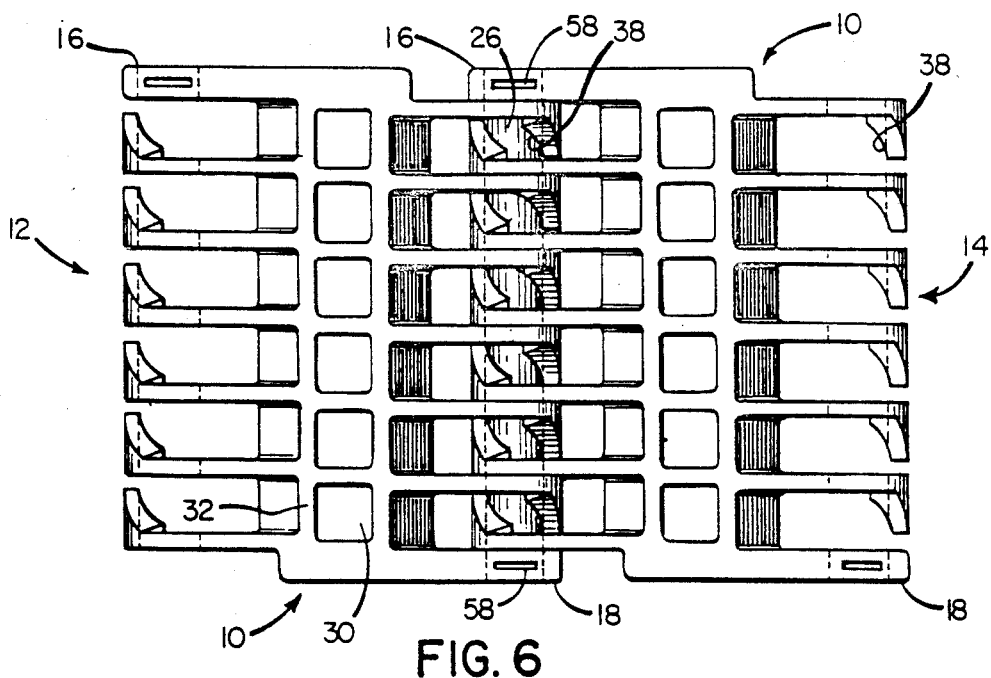
FIG. 6 is a top view of a pair of interconnected modules.

Triangular projections 36 are provided on each link end, except for ends 16 and 18, and extend transversely of the link, terminating short of the confronting link end by an amount to accommodate the link end of a mated link module. These projections serve as spacers to maintain interconnected modules in intended linked position as seen in FIG. 6. The inner surface 38 of projections 36 are cylindrically contoured to mate with the cylindrical surface of a pivot rod 26. These projections provide sufficient bearing surface area to accommodate the tensile forces of the interconnected modules being driven along a conveyor path, while providing exposure of significant portions of the pivot rod for ease of visual inspection and cleaning. The exposed pivot rod is also more responsive to temperature changes and tends to expand and contract by the same amount as the link structure. The skewed edges of the projections 36 also serve as wipers to push debris which may collect on the pivot rod away from the bearing area.

The diagonally opposite outer link ends 16 and 18 are thicker than the other end sections 22 and each includes slots 40 and 42 for accommodation of a retaining pin 44 which retains the pivot rod 26 within the aligned openings 24 of the mated modules. The outer link ends 16 and 18 are joined to respective side rails 46 and 48 which serve as rub rails to minimize damage to the sides or side edges of the module.

Figure 7:
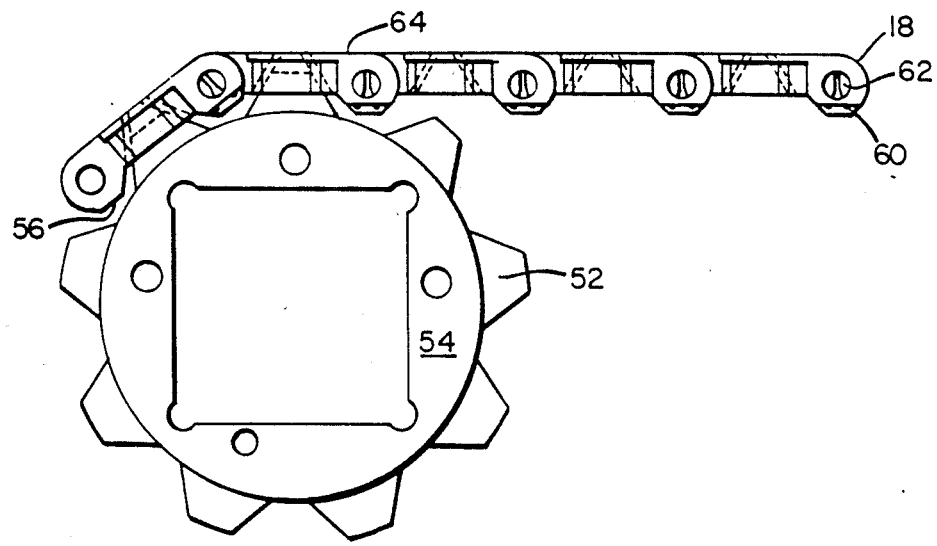
FIG. 7 is an elevation view of a modular conveyor belt embodying the invention and cooperative with a sprocket wheel.
Figure 8:
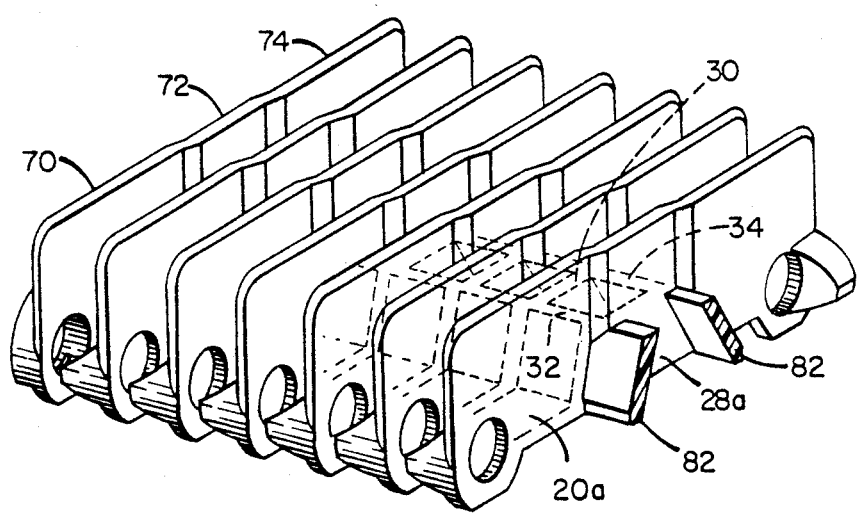
FIG. 8 is a perspective view of an alternative embodiment of the module of FIG. 1.
Figure 10:
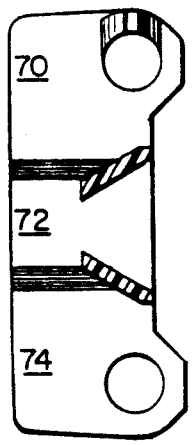
FIG. 10 is a sectional view taken along lines 10—10 of FIG. 9.
Figure 11:
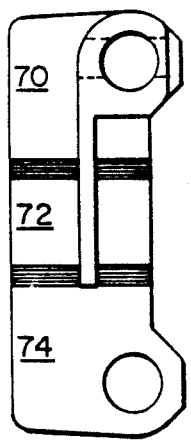
FIG. 11 is a sectional view taken along lines 11—11 of FIG. 9.
Figure 9:
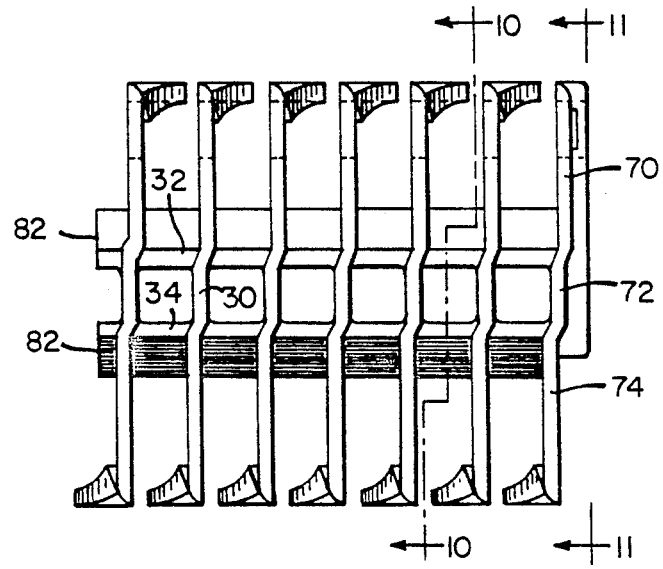
FIG. 9 is a top view of the module of FIG. 8.

The intermediate section 28 of the module composed of sections 30, 32, and 34, serves as a box beam across the width of the module which provides a structurally strong and lightweight module which is resistant to bending and which maintains its structural integrity under operating forces. The recesses 50 provided by the sections 30, 32, and 34 are operative as sprocket recesses located midway between the pivot axes of the module and which are adapted to mate with corresponding sprocket teeth 52 of an associated sprocket wheel 54, as shown in FIG. 7. The sprocket teeth 52 of the sprocket wheel include parallel side surfaces and inclined front and back surfaces configured to engage the corresponding surfaces of sprocket recesses 50. In the illustration of FIG. 7, the sprocket wheel 54 is adapted to be secured on a square shaft. A plurality of sprocket wheels is employed across the width of the module to provide intended support and driving force. The end sections of the module include flatted portions 56 to provide clearance between the linked modules and the sprocket wheel.

The sprocket recesses 50 can be considered as the inverse of the center sprocket teeth shown in copending application Ser. No. 013,165 and provide the same benefits of minimizing chordal action and scrubbing between the mating surfaces of the module and sprocket wheel. The placement of the sprocket recesses midway between the pivot axes, and the driving of the modules at this mid-position, rather than driving the modules at the position of the pivot axes as is conventionally done, provides substantially constant speed drive of the conveyor belt, substantially eliminates sprocket-to-belt wear, and provides a belt capable of faster running speeds than conventional belts by reason of the minimized chordal action and scrubbing.

The angled surfaces 32 and 34 of the intermediate section also serve to present greater surface area to water and/or steam jets which can be located above and below the modules for cleaning of the belt. The angled sections also facilitate visual inspection of the belt.

The modules are interconnected as illustrated in FIG. 6 by insertion of a pivot rod 26 between the aligned openings 24 of each pair of modules, and by insertion of retaining pins 44 into slots 40 and 42 of end sections 16 and 18 to secure the pivot rod within the linked modules. The pivot rod 26 is of a length to extend between the confronting inner surfaces of the retaining pins 44 to provide support of all linked ends. The retaining pins 44 are easily inserted by pushing each pin downwardly through a respective slot 40 and into seated engagement, with the upper portion 58 of the pin disposed within upper slot 40, the lower leg portions 60 disposed within slot 42, and the rounded midsection 62 secured within circular opening 24 of the associated end section. The retaining pin is sufficiently resilient for the legs to squeeze together as the pin is inserted, and once in seated position, to spring open to retain the pin within the end section. Removal of the pin is accomplished by pushing on the legs of the pin in lower slot 42, such as by a small screwdriver, to urge the pin out of the slots. Typically, the retaining pins can be fabricated in strip form by thin webs which join the top portion 58 and the legs of an adjacent pin. In use, individual pins are broken or cut from the interconnecting web as the pin is needed for insertion into the module end.

The modules are end-to-end reversible such that either linking end of the module can be joined to either linking end of an adjacent module. The edges of an assembled conveyor belt formed of these modules are in line as provided by the side rails 46 and 48, and the entire belt can be closely adjacent to a conveyor trough or side walls within which a product is conveyed on the conveyor surface 64 of the belt. The belt length can be changed in increments of one pitch by reason of the symmetry of the modules. The sprocket recesses 50 are in line and can be driven in either direction. The associated sprocket teeth are also symmetrical and in line such that the sprocket wheel can be driven in either direction and installed either way on a driving shaft.

Figure 12:
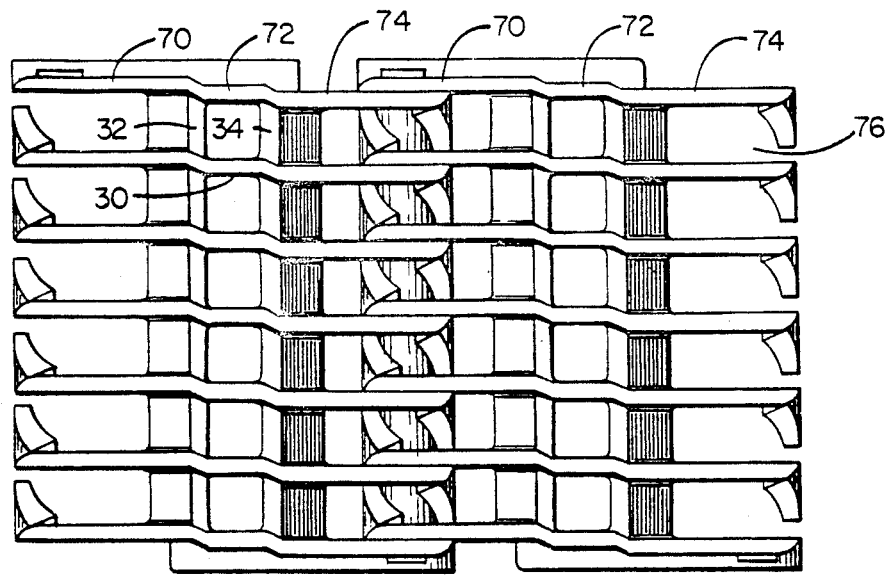
FIG. 12 is a top view of a pair of interconnected modules of FIG. 8.
Figure 14:
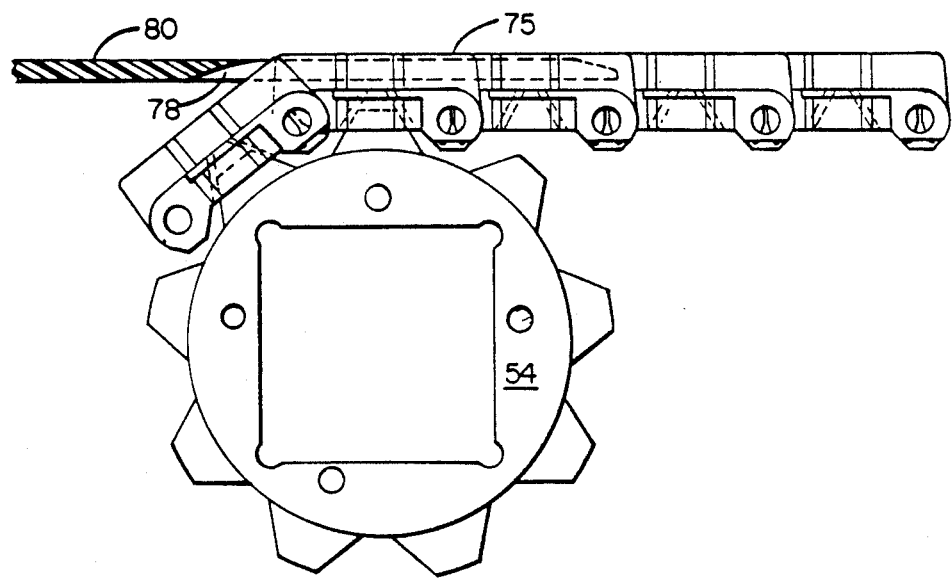
FIG. 14 is an elevation view of a conveyor belt composed of the modules of FIG. 8 and cooperative with a sprocket wheel.

An alternative embodiment is shown in FIGS. 8-11 in which the link sections are upwardly extending to provide an upper conveyor surface with axial passageways into which the teeth of a conveyor comb can extend while the belt is in motion. The sections 20a and 28a upwardly extend as raised flights or ribs which extend above the sections 30, 32, and 34 of the box beam intermediate section of the module. These raised ribs, identified by reference numerals 70, 72, and 74, are parallel to and laterally offset from each other, as are the link sections of the embodiment described above. The interconnected modules, as shown in FIG. 12, provide a substantially flat conveying surface 75, and the raised ribs define longitudinal channels 76 which are adapted to receive the teeth 78 of a conveyor comb 80 for transfer of products to and from the conveyor belt. As seen in FIG. 14, the conveyor comb 80 is disposed as a continuation of the conveying surface at a position at which the conveyor belt moves in a curved path around an associated sprocket wheel 54. The teeth 78 of the conveyor comb are disposed within respective channels 76 between the raised ribs, and preferably have inclined upper surfaces which taper downwardly from the comb surface to the teeth ends which lie below the conveying surface of the raised ribs. Typically, the comb is mounted for rotation about a pivot pin at the end opposite to the comb teeth and is spring loaded to urge the teeth into engagement with the upper surfaces of the intermediate section of the belt modules. The operation of this embodiment in conjunction with a conveyor comb is similar to the operation of the conveyor belt of U.S. Pat. Nos. 4,051,949 and 4,171,045, both assigned to the Assignee of this invention.

Figure 13:
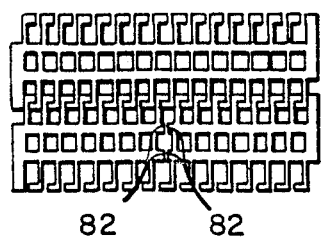
FIG. 13 is a top view illustrating the lateral interconnection of modules to form a conveyor belt of intended width.

In the embodiment of FIGS. 8–11, the modules are constructed for side-to-side assembly into a belt of intended overall width. One side of each module includes projections 82 which are extensions of the transverse sections 32 and 34 and which extend to a plane which is substantially midway between the gap of adjacent link ends. These projections engage like projections of a laterally adjacent module in an assembled belt to provide spacing and support of the laterally connected modules. Preferably, the modules are integral multiples of one another in width such that modules can be assembled in brick-laid fashion as shown in FIG. 13, with a module extending across the gap between two or more linked modules. The module can include a side rail if this module is to be at the lateral end of an assembled conveyor belt or, if the module is to be assembled at an intermediate position within a belt, can include projections 82 on each side. It will be appreciated that the embodiment of FIGS. 1–4 can also include projections 82 on one or both sides, rather than one or both side rails, for side-to-side assembly into belts of intended width.

The modules described above are preferably fabricated as an integral unitary structure by injection molding of a plastic material such as polyethylene. The particular plastic material is determined in accordance with the characteristics desired to suit a particular operating environment. The pivot rods and retaining pins are typically of the same more compatible plastic material. It is contemplated that changes and modifications may be made in the invention without departing from the spirit and true scope thereof. Accordingly, the invention is not to be limited by what has been particularly shown and described except as indicated in the appended claims.

What is claimed is:

1. A module for constructing a linked conveyor belt capable of being driven by sprockets in at least one direction of intended travel, said module having a width, a conveying surface and a bottom surface, and comprising:
    a first plurality of link ends;
    a second plurality of link ends;
    at least some of said first and second pluralities of link ends being formed to circumscribe a pivot hole;
    the pivot holes of each plurality of link ends being aligned on respective first and second substantially parallel pivot axes;
    an intermediate structure integral with and connecting the first and second pluralities of link ends;
    said intermediate structure having at least two transverse elements extending at least partially across the width of the module and substantially parallel to the pivot axes, and;
    a plurality of longitudinal members integral with the intersecting said transverse elements;
    said at least two transverse elements and said longitudinal members defining at least two sprocket recesses extending from the bottom surface toward the conveying surface and capable of receiving cooperative sprocket teeth;
    said at least two transverse elements having a driving surface within said sprocket recesses and at least a portion of each of said driving surfaces extending downwardly toward the bottom surface and in the direction of intended travel;
    said first and second pluralities of link ends and said intermediate structure being an integral structure of molded plastic material.

2. A module for constructing a linked conveyor belt capable of being driven by sprockets in at least one direction of intended travel, said module having a width, a conveying surface and a bottom surface, and comprising:
    a first plurality of link ends;
    a second plurality of link ends;
    at least some of said first and second pluralities of link ends being formed to circumscribe a pivot hole;
    the pivot holes of each plurality of link ends being aligned on respective first and second substantially parallel pivot axes;
    an intermediate structure integral with and connecting the first and second pluralities of link ends;
    said intermediate structure having at least two pairs of opposing transverse elements extending in a direction substantially parallel to the pivot axes, each of said elements extending at least partially across said width, and;
    a plurality of longitudinal members between the sides of the module intersecting the transverse elements;
    said transverse members and selected ones of said longitudinal members defining at least two recesses extending from the bottom surface toward the conveying surface and capable of receiving cooperative sprocket teeth;
    at least one of said transverse elements of each of said pairs having a driving surface within the respective recess, at least a portion of said driving surface extending downwardly toward the bottom surface and in the direction of intended travel;
    said first and second pluralities of link ends and said intermediate structure being an integral structure of molded plastic material.

3. A module for constructing a linked conveyor belt capable of being driven by sprockets in at least one intended direction of travel, said module having a width, a conveying surface and a bottom surface, and comprising:
    a first plurality of link ends;
    a second plurality of link ends;
    at least some of said first and second pluralities of link ends being formed to circumscribe a pivot hole:
    said first and second pluralities of link ends being spaced apart and dimensioned such that said module is suitable for bricklaying;
    the pivot holes of said first and second pluralities of link ends being aligned on respective first and second substantially parallel pivot axes;
    an intermediate structure integral with and connecting the first and second pluralities of link ends;
    said intermediate structure having at least two transverse members intermediate and substantially parallel to the pivot axes, and a plurality of longitudinal members intermediate the sides of the module and intersecting the transverse members, said transverse members extending at least partially across the width of the module;

said transverse members and selected ones of said longitudinal members defining at least two sprocket recesses, said recesses extending from the bottom surface toward the conveying surface and capable or receiving cooperative sprocket teeth;

said at least two transverse members having a driving surface within said sprocket recesses, at least a portion of said driving surfaces extending in direction downwardly from said conveying surface toward the bottom surface and in the direction of intended travel;

said first and second pluralities of link ends and said intermediate structure being an integral structure of molded plastic material;

at least some of said link ends having a first portion of a thickness along respective pivot axes which is less than the spacing between the first portions of adjacent link ends;

at least some of said link ends having a second rod bearing portion outward of the respective pivot axis for bearing on a pivot rod, said second portion having a thickness greater than said first portion along an axis parallel to the pivot axes and in the plane of the pivot axes.

4. A module for constructing a linked conveyor belt capable of being driven by sprockets in at least one direction of intended travel, said module having a width, a conveying surface and a bottom surface, and comprising:

a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two transverse elements extending at least partially across the width of the module and substantially parallel to the pivot axes, and;
a plurality of longitudinal members between the sides of the module intersecting the transverse elements;
said transverse elements and selected ones of said longitudinal members defining at least two sprocket recesses extending from the bottom surface toward the conveying surface and capable of receiving cooperative sprocket teeth;
said transverse elements having a driving surface within said recesses, at least a portion of the respective driving surfaces extending downwardly toward the bottom surface and in the direction of intended travel;
said first and second pluralities of link ends and said intermediate structure being an integral structure of molded plastic material; and
at least some of said longitudinal members having substantially parallel upstanding ribs defining channels which are capable of receiving the teeth of a cooperative conveyor comb.

5. A linked conveyor belt having at least one direction of intended travel comprising:
a plurality of modules having a width perpendicular to the direction of intended travel, a conveying surface and a bottom surface, at least some of said modules including;
a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two transverse elements extending in a direction substantially parallel to the pivot axes, each of said elements extending at least partially across said width, and;
a plurality of longitudinal members intersecting the transverse elements;
said transverse elements and selected ones of said longitudinal members defining at least two recesses extending from the bottom surface toward the conveying surface and capable of receiving cooperative sprocket teeth;
said transverse elements having a driving surface, at least a portion of said driving surface extending downwardly toward the bottom surface and in the direction of intended travel;
said first and second pluralities of link ends and said intermediate structure being an integral structure of molded plastic material;
at least some of said link ends of each of said modules being releasably engaged between link ends of an adjacent module; and
means for pivotally connecting said modules at engaged link ends.

6. A linked conveyor belt having at least one direction of intended travel, said belt comprising:
a plurality of modules having a width perpendicular to the direction of intended travel, a conveying surface and a bottom surface, at least some of said modules including;
a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two pairs of opposing transverse elements extending in a direction substantially parallel to the pivot axes, each of said elements extending at least partially across said width, and;
a plurality of longitudinal members intersecting the transverse elements;
said transverse elements and selected ones of said longitudinal members defining at least two recesses extending from the bottom surface toward the conveying surface and capable of receiving cooperative sprocket teeth;
at least two of said transverse elements having a driving surface within the respective recesses, at least a portion of said driving surfaces extending downwardly toward the bottom surface and in the direction of travel;
said first and second pluralities of link ends and said intermediate structure being an integral structure of molded plastic material;

at least some of said link ends of each of said modules being releasably engaged between link ends of an adjacent module; and means for pivotally connecting said modules at engaged link ends.

7. A linked conveyor belt having at least one direction of intended travel comprising:

a plurality of modules having a width perpendicular to the direction of intended travel, a conveying surface and a bottom surface, at least some of said modules including, a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending at least partially across the width of the module and substantially parallel to the pivot axes, and;

at least one longitudinal member intersecting each of said transverse elements;

said at least two transverse elements and selected ones of said longitudinal members defining at least two recesses extending from the bottom surface toward the conveying surface and capable of receiving cooperative sprocket teeth;

said transverse elements having a driving surface within said recesses, at least a portion of said driving surface extending downwardly toward the bottom surface and in the direction of intended travel;

said first and second pluralities of link ends and said intermediate structure being of integrally molded plastic material;

at least some of said link ends having a first portion of a thickness along respective pivot axes which is less than the spacing between the first portions of adjacent link ends;

at least some of said link ends having a second rod bearing portion outward of the respective pivot axis for bearing on a pivot rod, said second portion having thickness greater than said first portion along an axis parallel to the pivot axes and in the plane of the pivot axes;

at least some of said link ends of each of said modules being releasably engaged between link ends of an adjacent module; and means for pivotally connecting said modules at engaged link ends.

8. A linked conveyor belt having at least one direction of intended comprising:

a plurality of modules having a width perpendicular to the direction of intended travel, a conveying surface, and a bottom surface, at least some of said modules including;

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending at least partially across said width and substantially parallel to the pivot axes, and;

at least one longitudinal member intersecting each of the transverse elements;

said at least two transverse elements and selected ones of said longitudinal members defining at least two recesses extending from the bottom surface toward the conveying surface and capable of receiving cooperative sprocket teeth;

said transverse elements having a driving surface within the respective recesses, at least a portion of said driving surface extending downwardly toward the bottom surface and in the direction of travel;

said first and second pluralities of link ends and said intermediate structure being an integral structure of molded plastic material;

at least some of said longitudinal members including substantially parallel upstanding ribs defining longitudinal channels which are capable of receiving the teeth of a cooperative conveyor comb;

at least some of said link ends of each of said modules being releasably engaged between link ends of an adjacent module; and means for pivotally connecting said modules at engaged link ends.

9. The module of claim 1 wherein said link ends are of the same width.

10. The module of claim 1 wherein said link ends of the first and second pluralities have a uniform spacing between adjacent link ends.

11. The module of claim 1 wherein said longitudinal members are substantially parallel and extend in a direction transverse to said pivot axes.

12. The module of claim 1 wherein said intermediate structure includes a grid like structure.

13. The module of claim 12 wherein said grid like structure includes at least one cross member extending across the width of the module and said at least two transverse elements comprise portions of said cross member at predetermined locations across said width.

14. The module of claim 13 wherein said grid like structure further includes said plurality of longitudinal members and said longitudinal members intersect said cross member.

15. The module of claim 13 wherein said at least one cross member and said longitudinal members form a beam-like structure extending across said width.

16. The module of claim 13 wherein said module includes at least two cross members and said cross members and said longitudinal members form a box-beam like structure extending across said width.

17. The module of claim 1 wherein said module includes means for occluding a pivot hole to prevent passage of a pivot rod through the respective link end.

18. The module of claim 17 wherein said occluding means includes a clip removably insertable within the respective link end.

19. The module of claim 2 wherein said link ends are of the same width.

20. The module of claim 2 wherein said link ends of the first and second pluralities have a uniform spacing between adjacent link ends.

21. The module of claim 2 wherein said longitudinal members extend generally in direction transverse to the first and second pivot axes.

22. The module of claim 21 wherein said longitudinal members are substantially parallel.

23. The module of claim 2 wherein said intermediate structure includes a grid like structure.

24. The module of claim 23 wherein said grid like structure includes at least two cross members extending across the width of the module and said at least two pairs of opposing transverse elements comprise portions of said at least two cross members at predetermined locations across said width.

25. The module of claim 24 wherein said grid like structure further includes said plurality of longitudinal members and said longitudinal members intersect said at least two cross members at predetermined locations across said width.

26. The module of claim 23 wherein said at least two cross members and said longitudinal members form a boxbeam-like structure extending across said width.

27. The module of claim 2 wherein said module includes means for occluding a pivot hole to prevent passage of a pivot rod through the respective link end.

28. The module of claim 27 wherein said occluding means includes a clip removably insertable within the respective link end.

29. The module of claim 3 wherein said link ends are of the same width.

30. The module of claim 3 wherein said link ends of the first and second pluralities have a uniform spacing between adjacent link ends.

31. The module of claim 3 wherein said longitudinal members are substantially parallel and extend in a direction transverse to said pivot axes.

32. The module of claim 3 wherein said intermediate structure includes a grid like structure.

33. The module of claim 32 wherein said grid like structure includes at least one cross member extending across the width of the module and said at least two transverse elements comprise portions of said cross member at predetermined locations across said width.

34. The module of claim 33 wherein said grid like structure further includes said plurality of longitudinal members and said longitudinal members intersect said cross member.

35. The module of claim 34 wherein said at least one cross member and said longitudinal members form a beam-like structure extending across the width of said module.

36. The module of claim 35 wherein said module includes at least two cross members and said cross members and said longitudinal members form a box-beam like structure extending across said width.

37. The module of claim 3 wherein said module includes means for occluding at least one pivot hole to prevent passage of a pivot rod through the respective link end.

38. The module of claim 37 wherein said occluding means includes a clip removably insertable within one of said link ends.

39. The module of claim 4 wherein said link ends are of the same width.

40. The module of claim 4 wherein said link ends of the first and second pluralities have a uniform spacing between adjacent link ends.

41. The module of claim 4 wherein said longitudinal members are substantially parallel and extend in a direction transverse to said pivot axes.

42. The module of claim 4 wherein said intermediate structure includes a grid like structure.

43. The module of claim 42 wherein said grid like structure includes at least one cross member extending across the width of the module and said at least two transverse elements comprise portions of said cross member at predetermined locations across said width.

44. The module of claim 43 wherein said grid like structure further includes said plurality of longitudinal members and said longitudinal members intersect said cross member.

45. The module of claim 44 wherein said at least one cross member and said longitudinal members form a beam-like structure extending across the width of said module.

46. The module of claim 45 wherein said module includes at least two cross members and, said cross members and said longitudinal members form a box-beam like structure extending across said width.

47. The module of claim 4 wherein said module includes means for occluding at least one pivot hole to prevent passage of a pivot rod through the respective link end.

48. The module of claim 47 wherein said occluding means includes a clip removably insertable within one of said link ends.

49. The belt of claim 5 wherein said modules are assembled in a bricklayed manner which a side edge of each module disposed intermediate the side edges of a pivotally connected module and wherein said belt includes a plurality of modules having a width dimension narrower than said width such that said belt has side edges which are substantially co-linear when the belt is assembled in said bricklayed manner.

50. The belt of claim 5 wherein at least some of said modules have link ends which are all of the same width.

51. The belt of claim 5 wherein at least some of said modules have all of the link ends of the first and second pluralities spaced apart by a uniform distance.

52. The belt of claim 5 wherein, in at least some of said modules, the number of link ends in said first plurality equals the number of link ends in said second plurality.

53. The belt of claim 5 wherein at least some of said modules include a means for occluding a pivot hole to prevent passage of a pivot rod through the respective link end.

54. The belt of claim 47 wherein at least some of said modules having said occluding means are disposed along the edges of the belt.

55. The belt of claim 5 wherein all of said longitudinal members in at least some of said modules are substantially parallel and extend in a direction transverse to said pivot axes.

56. The belt of claim 5 wherein said intermediate structure in at least some of said modules comprises a grid like structure.

57. The belt of claim 5 wherein said grid like structure includes at least one cross member extending across the width of the module and said at least two transverse elements comprise portions of said cross member.

58. The belt of claim 57 wherein said grid like structure further includes said plurality of longitudinal members and said longitudinal members intersect said cross member at predetermined locations across said width.

59. The belt of claim 58 wherein said at least one cross member and said longitudinal members in at least some of said modules form a beam-like structure extending across said width.

60. The belt of claim 59 wherein at least some of said modules include at least two cross members and said cross members and said longitudinal members form a box-beam like structure extending across said width of the respective modules.

61. The belt of claim 6 wherein said modules are assembled in a bricklayed manner which a side edge of each module disposed intermediate the side edges of a pivotally connected module and wherein said belt includes a plurality of modules having a width dimension narrower than said width such that said belt has side edges which are substantially co-linear when the belt is assembled in said bricklayed manner.

62. The belt of claim 6 wherein at least some of said modules have link ends which are all of substantially the same width.

63. The belt of claim 6 wherein at least some of said modules have all of the link ends of the first and second pluralities spaced apart by a uniform distance.

64. The belt of claim 6 wherein the number of link ends in said first plurality equals the number of link ends in said second plurality in at least some of said modules.

65. The belt of claim 6 wherein at least some of said modules include a means for occluding a pivot hole to prevent passage of a pivot rod through the respective link end.

66. The belt of claim 65 wherein at least some of said modules having said occluding means are disposed along the edges of the belt.

67. The belt of claim 6 wherein all of said longitudinal members in at least some of said modules are substantially parallel and extend in a direction transverse to said pivot axes.

68. The belt of claim 6 wherein said intermediate structure in at least some of said modules includes a grid like structure.

69. The belt of claim 68 wherein said grid like structure includes two cross members extending across the width of the respective module and said transverse elements of said at least two pairs of opposing transverse elements comprise portions of said two cross members.

70. The belt of claim 69 wherein said grid like structure further includes said plurality of longitudinal members and said longitudinal members intersect said cross members at predetermined locations across said width.

71. The belt of claim 70 wherein said at least two cross members and said longitudinal members in at least some of said modules form a boxbeam-like structure extending across said width.

72. The belt of claim 8 wherein said modules are assembled in a bricklayed manner which a side edge of each module disposed intermediate the side edges of a pivotally connected module and wherein said belt includes a plurality of modules having a width dimension narrower than said width such that said belt has side edges which are substantially co-linear when the belt is assembled in said bricklayed manner.

73. The belt of claim 8 wherein at least some of said modules have link ends which are all of substantially the same width.

74. The belt of claim 8 wherein at least some of said modules have all of the link ends of the first and second pluralities spaced apart by a uniform distance.

75. The belt of claim 8 wherein, in at least some of said modules, the number of link ends in said first plurality equals the number of link ends in said second plurality.

76. The belt of claim 8 wherein at least some of said modules include a means for occluding a pivot hole to prevent passage of a pivot rod through the respective link end.

77. The belt of claim 76 wherein at least some of said modules having said occluding means are disposed along the edges of the belt.

78. The belt of claim 8 wherein all of the longitudinal members in at least some of said modules are parallel and said longitudinal members extend in a direction substantially parallel to the direction of belt travel.

79. The belt of claim 8 wherein said intermediate structure in at least two of said modules includes a grid like structure.

80. The belt of claim 79 wherein said grid like structure includes at least one cross member extending across the width of the respective modules and said at least two transverse elements comprise portions of said cross member.

81. The belt of claim 80 wherein said grid like structure further includes said plurality of longitudinal members and said longitudinal members intersect said cross member at predetermined locations across said width.

82. The belt of claim 81 wherein said at least one cross member and said longitudinal members in at least some of said modules form a beam-like structure extending across said width.

83. The belt of claim 82 wherein at least some of said modules include at least two cross members and said cross members and said longitudinal members form a box-beam like structure extending across the width of the respective modules.

84. The module of claims 1, 2, 3 or 4 wherein the number of link ends in said first plurality is identical to the number of link ends in said second plurality.

85. The module of claims 1, 2, 3, or 4 wherein said driving surfaces of said transverse elements are planar.

86. The module of claims 1, 2, 3, or 4 wherein said pivot holes are circular.

87. The module of claims 1, 2, 3, or 4 wherein the link ends of said first and second pluralities other than the link ends disposed at edges of said module are disposed on uniform centerlines extending in the direction of intended travel.

88. The module of claims 1, 2, 3 or 4 wherein said intermediate structure includes at least one cross member extending across the width of the module and at least two of said transverse elements comprise portions of said at least one cross member.

* * * * *

UNITED STATES PATENT AND TRADEMARK OFFICE
CERTIFICATE OF CORRECTION

PATENT NO. : B1 4,934,518
DATED : January 31, 1995
INVENTOR(S) : James M. Lapeyre It is certified that error appears in the above-identified patent and that said Letters Patent is hereby corrected as shown below:

Title Page:
Item [63] delete "continuation-in-part" and insert therefor -- continuation --

Signed and Sealed this

Seventeenth Day of October, 1995

Attest:

BRUCE LEHMAN

Attesting Officer          Commissioner of Patents and Trademarks

REEXAMINATION CERTIFICATE (2462nd)
United States Patent [19]

Lapeyre

[11] B1 4,934,518

[45] Certificate Issued Jan. 31, 1995

[54] MODULAR CENTER DRIVE CONVEYOR BELT

[75] Inventor: James M. Lapeyre, New Orleans, La.

[73] Assignee: Laitram Corporation, Harahan, La.

Reexamination Request:
No. 90/003,333, Feb. 11, 1994

Reexamination Certificate for:
Patent No.: 4,934,518
Issued: Jun. 19, 1990
Appl. No.: 352,641
Filed: May 12, 1989

Related U.S. Application Data

[63] Continuation of Ser. No. 277,512, Nov. 28, 1988, abandoned, which is a continuation-in-part of Ser. No. 52,845, May 21, 1987, abandoned, which is a continuation of Ser. No. 179,523, Aug. 19, 1990, Pat. No. 4,832,187.

[51] Int. Cl.[6] ............................................. B65G 17/06
[52] U.S. Cl. .................................................... 198/853
[58] Field of Search .......................... 198/834, 851–853

[56] References Cited

U.S. PATENT DOCUMENTS

3,726,569  4/1973  Maglio et al. ...................... 198/853
3,826,150  2/1974  Palmaer.
4,886,158  12/1989  LaPeyre ............................. 198/853

OTHER PUBLICATIONS

KVP Systems Flyer CS-72.
KVP Systems 1973 Catalog.
KVP Systems 1977 Catalog.
"Plastic Chain Resists Constant Impacts", *Food Processing*, Feb. 1974.

*Primary Examiner*—Joseph E. Valenza
*Attorney, Agent, or Firm*—McAndrews, Held & Malloy, Ltd.

[57] ABSTRACT

A conveyor belt composed of a plurality of interconnected modules, each of identical construction and end to end mateable. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket.

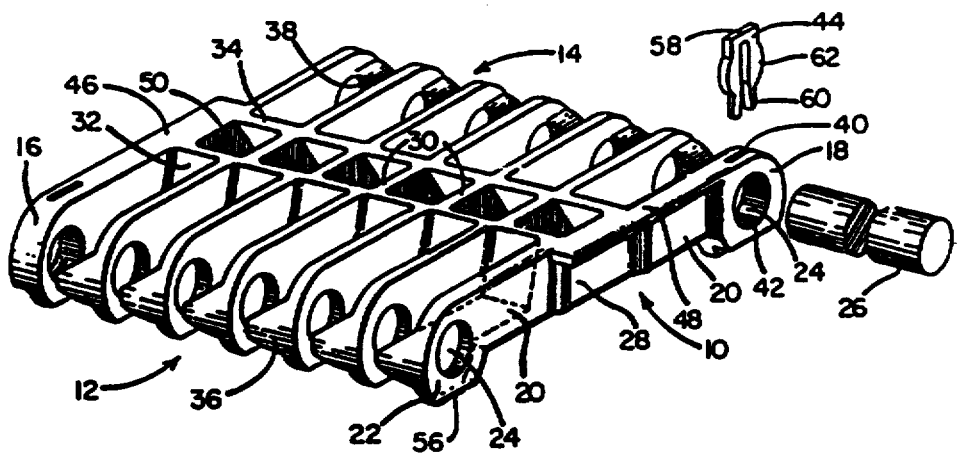

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4, 7–9, 13–16, 19, 24, 25, 29–50, 54, 57–62, 69–83 and 84–88 is confirmed.

Claims 1, 2, 5, 6, 10–12, 17, 18, 20–23, 26–28, 51–53, 55, 56, 63–68 and 84–98 are determined to be patentable as amended.

New claims 89–103 are added and determined to be patentable.

1. A module for constructing a linked conveyor belt capable of being driven by sprockets in at least one direction of intended travel, said module having a width, [a] *an upper* conveying surface *on which a product is conveyed,* and a bottom surface, and comprising:
   a first plurality of link ends;
   a second plurality of link ends;
   at least some of said first and second pluralities of link ends being formed to circumscribe a pivot hole;
   the pivot holes of each plurality of link ends being aligned on respective first and second substantially parallel pivot axes;
   an intermediate structure integral with and connecting the first and second pluralities of link ends, said intermediate structure having at least two transverse elements extending at least partially across the width of the module and substantially parallel to the pivot axes, *said intermediate structure forming at least part of said upper conveying surface;* and [ ; ]
   a plurality of longitudinal members integral with [the] *and* intersecting said transverse elements,
   said at least two transverse elements and said longitudinal members defining at least two sprocket recesses extending from the bottom surface toward the conveying surface and capable of receiving cooperative sprocket teeth;
   said at least two transverse elements having a driving surface within said sprocket recesses and at least a portion of each of said driving surfaces extending downwardly toward the bottom surface and in the direction of intended travel;
   said first and second pluralities of link ends and said intermediate structure being an integral structure of molded plastic material.

2. A module for constructing a linked conveyor belt capable of being driven by sprockets in at least one direction of intended travel, said module having a width, [a] *an upper* conveying surface *on which a product is conveyed,* and a bottom surface, and comprising:
   a first plurality of link ends;
   a second plurality of link ends;
   at least some of said first and second pluralities of link ends being formed to circumscribe a pivot hole;
   the pivot holes of each plurality of link ends being aligned on respective first and second substantially parallel pivot axes;
   an intermediate structure integral with and connecting the first and second pluralities of link ends;
   said intermediate structure having at least two pairs of opposing transverse elements extending in a direction substantially parallel to the pivot axes, each of said elements extending at least partially across said width, *said intermediate structure forming at least part of said upper conveying surface;* and [ ; ]
   a plurality of longitudinal members between the sides of the module intersecting the transverse elements;
   said transverse members and selected ones of said longitudinal members defining at least two recesses extending from the bottom surface toward the conveying surface and capable of receiving cooperative sprocket teeth;
   at least one of said transvere elements each of said pairs having a driving surface within the respective recess, at least a portion of said driving surface extending downwardly toward the bottom surface and in the direction of intended travel;
   said first and second pluralities of link ends and said intermediate structure being an integral structure of molded plastic material.

5. A linked conveyor belt having at least one direction of intended travel comprising:
   a plurality of modules having side edges and a width perpendicular to the direction of intended travel, [a] *an upper* conveying surface *on which a product is conveyed,* and a bottom surface, at least some of said modules including;
   a first plurality of link ends;
   a second plurality of link ends;
   at least some of said first and second pluralities of link ends being formed to circumscribe a pivot hole;
   the pivot holes of each plurality of link ends being aligned on respective first and second substantially parallel pivot axes;
   an intermediate structure integral with and connecting the first and second pluralities of link ends;
   said intermediate structure having at least two transverse elements extending in a direction substantially parallel to the pivot axes, each of said elements extending at least partially across said width, *said intermediate structure forming at least part of said upper conveying surface;* [and;]
   a plurality of longitudinal members intersecting the transverse elements;
   said transverse elements and selected ones of said longitudinal members defining at least two recesses extending from the bottom surface toward the conveying surface and capable of receiving cooperative sprocket teeth;
   said transverse elements having a driving surface, at least a portion of said driving surface extending downwardly toward the bottom surface and in the direction of intended travel;
   said first and second pluralities of link ends and said intermediate structure being an integral structure of molded plastic material;
   at least some of said link ends of each of said modules being releasably engaged between link ends of an adjacent module;

means for pivotally connecting said modules at engaged link ends.

6. A linked conveyor belt having at least one direction of intended travel, said belt comprising:
a plurality of modules having a width perpendicular to the direction of intended travel, [a] *an upper conveying surface on which a product is conveyed,* and a bottom surface, at least some of said modules including:
a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two pairs of opposing transverse elements extending in a direction substantially parallel to the pivot axes, each of said elements extending at least partially across said width, *said intermediate structure forming at least part of said upper conveying surface;* and [;]
a plurality of longitudinal members intersecting the transverse elements;
said transverse elements and selected ones of said longitudinal members defining at least two recesses extending from the bottom surface toward the conveying surface and capable of receiving cooperative sprocket teeth;
at least two said transverse elements having a driving surface within the respective recesses, at least a portion of said driving surfaces extending downwardly toward the bottom surface and in the direction of travel;
said first and second pluralities of link ends and said intermediate structure being an integral structure of molded plastic material;
at least some of said link ends of each of said modules being releasably engaged between link ends of an adjacent module; and
means for pivotally connecting said modules at engaged link ends.

8. A linked conveyor belt having at least one direction of intended *travel* comprising:
a plurality of modules having a width perpendicular to the direction of intended travel, a conveying surface, and a bottom surface, at least some of said modules including:
a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two transverse elements extending at least partially across said width and substantially parallel to the pivot axes; and [;]
at least one longitudinal member intersecting each of the transverse elements;
said at least two transverse elements and selected ones of said longitudinal members defining at least two recesses extending from the bottom surface toward the conveying surface and capable of receiving cooperative sprocket teeth;
said transverse elements having a driving surface within the respective recesses, at least a portion of said driving surface extending downwardly toward the bottom surface and in the direction of travel;
said first and second pluralities of link ends and said intermediate structure being an integral structure of molded plastic material;
at least some of said longitudinal members including substantially parallel upstanding ribs defining longitudinal channels which are capable of receiving the teeth of a cooperative conveyor comb;
at least some of said link ends of each said modules being releasably engaged between link ends of an adjacent module; and
means for pivotally connecting said modules at engaged link ends.

9. *A module for constructing a linked conveyor belt capable of being driven by sprockets in at least one direction of intended travel, said module having a width, a conveying surface and a bottom surface, and comprising:*
*a first plurality of link ends;*
*a second plurality of link ends;*
[The module of claim 1 wherein] said *first and second plurality of* link ends [are of] *being* the same width, *and at least some of said first and second pluralities of link ends being formed to circumscribe a pivot hole;*
*the pivot holes of each plurality of link ends being aligned on respective first and second substantially parallel pivot axes;*
*an intermediate structure integral with and connecting the first and second pluralities of link ends,*
*said intermediate structure having at least two transverse elements extending at least partially across the width of the module and substantially parallel to the pivot axes; and*
*a plurality of longitudinal members integral with and intersecting said transverse elements,*
*said at least two transverse elements and said longitudinal members defining at least two sprocket recesses extending from the bottom surface toward the conveying surface and capable of receiving cooperative sprocket teeth;*
*said at least two transverse elements having a driving surface within said sprocket recesses and at least a portion of each of said driving surfaces extending downwardly toward the bottom surface and in the direction of intended travel;*
*said first and second pluralities of link ends and said intermediate structure being an integral structure of molded plastic material.*

13. *A module for constructing a linked conveyor belt capable of being driven by sprockets in at least one direction of intended travel, said module having a width, a conveying surface and a bottom surface, and comprising:*
*a first plurality of link ends;*
*a second plurality of link ends;*
*at least some of said first and second pluralities of link ends being formed to circumscribe a pivot hole;*
*the pivot holes of each plurality of link ends being aligned on respective first and second substantially parallel pivot axes;*
*an intermediate structure integral with and connecting the first and second pluralities of link ends;*
*said intermediate structure having at least two transverse elements extending at least partially across the width of the module and substantially parallel to the pivot axes; and,* a plurality of longitudinal members integral with and intersecting said transverse elements, said at least two transverse elements and said longitudinal members defining at least two sprocket recesses extending from the bottom surface toward the conveying surface and capable of receiving cooperative sprocket teeth;

said at least two transverse elements having a driving surface within said sprocket recesses and at least a portion of each of said driving surfaces extending downwardly toward the bottom surface and in the direction of intended travel;

said intermediate structure including a grid like structure, [The module of claim 12 wherein] said grid like structure [includes] *including* at least one cross member extending across the width of the module and said at least two transverse elements [comprise] *comprising* portions of said cross member at predetermined locations across said width; and said first and second pluralities of link ends and said intermediate structure being an integral structure of molded plastic material.

19. A module for constructing a linked conveyor belt capable of being driven by sprockets in at least one direction of intended travel, said module having a width, a conveying surface and a bottom surface, and comprising:

a first plurality of link ends;

a second plurality of link ends;

[The module of claim 2 wherein] said *first and second pluralities of* link ends [are of] *being* the same width;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two pairs of opposing transverse elements extending in a direction substantially parallel to the pivot axes, each of said elements extending at least partially across said width; and a plurality of longitudinal members between the sides of the module intersecting the transverse elements;

said transverse members and selected ones of said longitudinal members defining at least two recesses extending from the bottom surface toward the conveying surface and capable of receiving cooperative sprocket teeth;

at least one of said transverse elements of each of said pairs having a driving surface within the respective recess, at least a portion of said driving surface extending downwardly toward the bottom surface and in the direction of intended travel;

said first and second pluralities of link ends and said intermediate structure being an integral structure of molded plastic material.

24. A module for constructing a linked conveyor belt capable of being driven by sprockets in at least one direction of intended travel, said module having a width, a conveying surface and a bottom surface, and comprising:

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two pairs of oppposing transverse elements extending in a direction substantially parallel to the pivot axes, each of said elements extending at least partially across said width, and;

a plurality of longitudinal members between the sides of the module intersecting the transverse elements;

said transverse members and selected ones of said longitudinal members defining at least two recesses extending from the bottom surface toward the conveying surface and capable of receiving cooperative sprocket teeth;

at least one of said transverse elements of each of said pairs having a driving surface within the respective recess, at least a portion of said driving surface extending downwardly toward the bottom surface and in the direction of intended travel;

said intermediate structure including a grid like structure, [The module of claim 23 wherein] said grid like structure [includes] *including* at least two cross members extending across the width of the module and said at least two pairs of opposing transverse elements [comprise] *comprising* portions of said at least two cross members at predetermined locations across said width; and said first and second pluralities of link ends and said intermediate structure being an integral structure of molded plastic material.

49. A linked conveyor belt having at least one direction of intended travel comprising:

a plurality of modules having side edges and a width perpendicular to the direction of intended travel, a conveying surface and a bottom surface, at least some of said modules including;

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending in a direction substantially parallel to the pivot axes, each of said elements extending at least partially across said width;

a plurality of longitudinal members intersecting the transverse elements;

said transverse elements and selected ones of said longitudinal members defining at least two recesses extending from the bottom surface toward the conveying surface and capable of receiving cooperative sprocket teeth;

said transverse elements having a driving surface, at least a portion of said driving surface extending downwardly toward the bottom surface and in the direction of intended travel;

said first and second pluralities of link ends and said intermediate structure being an integral structure of molded plastic material;

at least some of said link ends of each of said modules being releasably engaged between link ends of an adjacent module;

means for pivotally connecting said modules at engaged link ends;

[The belt of claim 5 wherein] said modules [are] being assembled in a bricklayed manner, [which] a [said] side edge of each module being disposed intermediate the side edges of a pivotally connected module; and

[wherein] said belt [includes] further including a plurality of end modules having side edges, some of said end modules having a width dimension narrower than the [said] width dimension of other of said modules such that [said belt has] a side [edges] edge of some of said modules is [which are] substantially co-linear with the side edge of a pivotally connected other of said modules when the belt is assembled in said bricklayed manner.

50. The linked conveyor belt having at least one direction of intended travel comprising:

a plurality of modules having side edges and a width perpendicular to the direction of intended travel, a conveying surface and a bottom surface, at least some of said modules including;

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending in a direction substantially parallel to the pivot axes, each of said elements extending at least partially across said width;

a plurality of longitudinal members intersecting the transverse elements;

said transverse elements and selected ones of said longitudinal members defining at least two recesses extending from the bottom surface toward the conveying surface and capable of receiving cooperative sprocket teeth;

said transverse elements having a driving surface, at least a portion of said driving surface extending downwardly toward the bottom surface and in the direction of intended travel;

said first and second pluralities of link ends and said intermediate structure being an integral structure of molded plastic material;

at least some of said link ends of each of said modules being releasably engaged between link ends of an adjacent module;

[The belt of claim 5 wherein] at least some of said modules [have] having link ends which are of the same width; and means for pivotally connecting said modules at engaged link ends.

57. A linked conveyor belt having at least one direction of intended travel comprising:

a plurality of modules having a width perpendicular to the direction of intended travel, a conveying surface and a bottom surface, at least some of said modules including;

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure including a grid like structure [The belt of claim 5 wherein] said grid like structure [includes] including at least one cross member extending across the width of the module and said at least two transverse elements [comprise] comprising portions of said cross member;

said intermediate structure having at least two transverse elements extending in a direction substantially parallel to the pivot axes, each of said elements extending at least partially across said width; and a plurality of longitudinal members intersecting the transverse elements;

said transverse elements and selected ones of said longitudinal members defining at least two recesses extending from the bottom surface toward the conveying surface and capable of receiving cooperative sprocket teeth;

said transverse elements having a driving surface, at least a portion of said driving surface extending downwardly toward the bottom surface and in the direction of intended travel;

said first and second pluralities of link ends and said intermediate structure being an integral structure of molded plastic material;

at least some of said link ends of each of said modules being releasably engaged between link ends of an adjacent modules; and means for pivotally connecting said modules at engaged link ends.

61. A linked conveyor belt having at least one direction of intended travel, said belt comprising:

a plurality of modules having a width perpendicular to the direction of intended travel, a conveying surface and a bottom surface, at least some of said modules including:

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes, an intermediate structure integral with and connecting the first and second pluralities of link ends;

said intermediate structure having at least two pairs of opposing transverse elements extending in a direction substantially parallel to the pivot axes, each of said elements extending at least partially across said width, and a plurality of longitudinal members intersecting the transverse elements;

said transverse elements and selected ones of said longitudinal members defining at least two recesses extending from the bottom surface toward the conveying surface and capable of receiving cooperative sprocket teeth;

at least two said transverse elements having a driving surface within the respective recesses, at least a portion of said driving surfaces extending downwardly toward the bottom surface and in the direction of travel;

said first and second pluralities of link ends and said intermediate structure being an integral structure of molded plastic material;

at least some of said link ends of each of said modules being releasably engaged between link ends of an adjacent module;

[The belt of claim 6 wherein] said modules [are] being assembled in a bricklayed manner, [which] a [said] side edge of each module *being* disposed intermediate the side edges of a pivotally connected module; and

[wherein] said belt [includes] *further including* a plurality of *end* modules having *side edges, some of said end modules having* a width dimension narrower than *the* [said] width *dimension of other of said modules such that* [said belt has] *a* side [edges] *edge of some of said molules is* [which are] substantially co-linear *with the side edge of a pivotally connected other of said modules* when the belt is assembled in said bricklayed manner; and means for pivotally connecting said modules at engaged link ends.

62. A linked conveyor belt having at least one direction of intended travel, said belt comprising:

a plurality of modules having a width perpendicular to the direction of intended travel, a conveying surface and a bottom surface, at least some of said modules including:

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two pairs of opposing transverse elemenets extending in a direction substantially parallel to the pivot axes, each of said elements extending at least partially across said width, and a plurality of longitudinal members intersecting the transverse elements;

said transverse elements and selected ones of said longitudinal members defining at least two recesses extending from the bottom surface toward the conveying surface and capable of receiving cooperative sprocket teeth;

at least two said transverse elements having a driving surface within the respective recesses, at least a portion of said driving surfaces extending downwardly toward the bottom surface and in the direction of travel;

said first and second pluralities of link ends and said intermediate structure being an integral structure of molded plastic material;

at least some of said link ends of each of said modules being releasably engaged between link ends of an adjacent module;

[The belt of claim 6 wherein] at least some of said modules [have] *having* link ends which are all of substantially the same width; and means for pivotally connecting said modules at engaged link ends.

69. A linked conveyor belt having at least one direction of intended travel, said belt comprising:

a plurality of modules having a width perpendicular to the direction of intended travel, a conveying surface and a bottom surface, at least some of said modules including:

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

said intermediate structure in at least some of said modules including a grid like structure;

[The belt of claim 68 wherein] said grid like structure [includes] *including* two cross members extending across the width of the respective module and said transverse elemenets of said at least two pairs of opposing transverse elements [comprise] *comprising* portions of said two cross members; *and*

*an intermediate structure integral with and connecting the first and second pluralities of link ends;*

*said intermediate structure having at least two pairs of opposing transverse elements extending in a direction substantially parallel to the pivot axes, each of said elements extending at least partially across said width, and*

*a plurality of longitudinal members intersecting the transverse elements;*

*said transverse elements and selected ones of said longitudinal members defining at least two recesses extending from the bottom surface toward the conveying surface and capable of receiving cooperative sprocket teeth;*

*at least two said transverse elements having a driving surface within the respective recesses, at least a portion of said driving surfaces extending downwardly toward the bottom surface and in the direction of travel;*

*said first and second pluralities of link ends and said intermediate structure being an integral structure of molded plastic material;*

*at least some of said link ends of each of said modules being releasably engaged between link ends of an adjacent module; and* means for pivotally connecting said modules at engaged link ends.

72. A linked conveyor belt having at least one direction of intended travel comprising:

a plurality of modules having a width perpendicular to the direction of intended travel, a conveying surface, and a bottom surface, at least some of said modules including;

a first plurality of link ends;

a second plurality of link ends;

at least some of said first and second plurality of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending at least partially across said width and substantially parallel to the pivot axes, and;

at least one longitudinal member intersecting each of the transverse elements;

said at least two transverse elements and selected ones of said longitudinal members defining at least two recesses extending from the bottom surface toward the conveying surface and capable of receiving cooperative sprocket teeth;

said transverse elements having a driving surface within the respective recesses, at least a portion of said driving surface extending downwardly toward the bottom surface and in the direction of travel;

said first and second pluralities of link ends and said intermediate structure being an integral structure of molded plastic material;

at least some of said longitudinal members including substantially parallel upstanding ribs defining longitudinal channels which are capable of receiving the teeth of a cooperative conveyor comb;

at least some of said link ends of each of said modules being releasably engaged between link ends of an adjacent module;

[The belt of claim 8 wherein] *said modules* [are] *being* assembled in a bricklayed manner, [which] a [said] side edge of each module *being* disposed intermediate the side edges of a pivotally connected module; and

[wherein] said belt [includes] *further including* a plurality of *end modules having side edges, some of said end modules having* a width dimension narrower than *the* [said] width *dimension of other of said modules* such that [said belt has] *a* side [edges] *edge of some of said modules being* [which are] substantially co-linear *with the side edge of a pivotally connected other of said modules when the belt is assembled in said bricklayed manner;* and means for pivotally connecting said modules at engaged link ends.

89. The module of claim 13 wherein said link ends of the first and second pluralities have a uniform spacing between adjacent link ends.

90. The module of claim 13 wherein said longitudinal members are substantially parallel and extend in a direction transverse to said pivot axes.

91. The module of claim 24 wherein said link ends of the first and second pluralities have a uniform spacing between adjacent link ends.

92. The module of claim 24 wherein said longitudinal members extend generally in a direction transverse to the first and second pivot means.

93. The belt of claim 69 wherein at least some of said modules have all of the link ends of the first and second pluralities spaced apart by a uniform distance.

94. The belt of claim 69 wherein the number of link ends in said first plurality equals the number of link ends in said second plurality in at least some of the modules.

95. The belt of claim 69 wherein all of said longitudinal members in at least some of the modules are substantially parallel and extend in a direction transverse to said pivot axes.

96. A module for constructing a linked conveyor belt capable of being driven by sprockets in at least one direction of intended travel, said module having a width, a conveying surface and a bottom surface, and comprising:
a first plurality of link ends;
a second plurality of link ends;
the number of link ends in said first plurality being identical to the number of link ends in said second plurality;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two transverse elements extending at least partially across the width of the module and substantially parallel to the pivot axes; and
a plurality of longitudinal members integral with and intersecting said transverse elements,
said at least two transverse elements and said longitudinal members defining at least two sprocket recesses extending from the bottom surface toward the conveying surface and capable of receiving cooperative sprocket teeth;
said at least two transverse elements having a driving surface within said sprocket recesses and at least a portion of each of said driving surfaces extending downwardly toward the bottom surface and in the direction of intended travel;
said first and second pluralities of link ends and said intermediate structure being an integral structure of molded plastic material.

97. A module for constructing a linked conveyor belt capable of being driven by sprockets in at least one direction of intended travel, said module having a width, a conveying surface and a bottom surface, and comprising:
a first plurality of link ends;
a second plurality of link ends;
the number of link ends in said first plurality being identical to the number of link ends in said second plurality;
at least some of said first and second pluralities of link ends being formed to circumscribe a pivot hole;
the pivot holes of each plurality of link ends being aligned on respective first and second substantially prallel pivot axes;
an intermediate structure integral with and connecting the first and second pluralities of link ends;
said intermediate structure having at least two pairs of opposing transverse elements extending in a direction substantially parallel to the pivot axes, each of said elements extending at least partially across said width; and
a plurality of longitudinal members between the sides of the module intersecting the transverse elements;
said transverse members and selected ones of said longitudinal members defining at least two recesses extending from the bottom surface toward the conveying surface and capable of receiving cooperative sprocket teeth;
at least one of said transverse elements of each of said pairs having a driving surface within the respective recess, at least a portion of said driving surface extending downwardly toward the bottom surface and in the direction of intended travel;
said first and second pluralities of link ends and said intermediate structure being an integral structure of molded plastic material.

98. A module for constructing a linked conveyor belt capable of being driven by sprockets in at least one direction of intended travel, said module having a width, a conveying surface and a bottom surface, and comprising:
a first plurality of link ends;
a second plurality of link ends;
at least some of said first and second pluralities of link ends being formed to circumscribe a pivot hole;
the pivot holes of each plurality of link ends being aligned on respective first and second substantially parallel pivot axes;

an intermediate structure integral with and connecting the first and second pluralities of link ends;

said intermediate structure having at least two transverse elements extending at least partially across the width of the module and substantiall parallel to the pivot axes; and, a plurality of longitudinal members integral with and intersecting said transverse elements, said at least two transverse elements and said longitudinal members defining at least two sprocket recesses extending from the bottom surface toward the conveying surface and capable of receiving cooperative sprocket teeth;

said at least two transverse elements having a driving surface within said sprocket recesses and at least a portion of each of said driving surfaces extending downwardly toward the bottom surface and in the direction of intended travel, said driving surfaces of said transverse elements being planar;

said first and second pluralities of link ends and said intermediate structure being an integrl structure of molded plastic material.

99. A module for constructing a linked conveyor belt capable of being driven by sprockets in at least one direction of intended travel, said module having a width, a conveying surface and a bottom surface, and comprising:

a first plurality of link ends;

a second plurality of link ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and sedcond pluralities of link ends;

said intermediate structure having at least two pairs of opposing transverse elements extending in a direction substantially parallel to the pivot axes, each of said elements extending at least partially across said width, and;

a plurality of longitudinal members between the sides of the module intersecting the transverse elements;

said transverse members and selected ones of said longitudinal members defining at ledast two recesses extending from the bottom surface toward the conveying surface and capable of receiving cooperative sprocket teeth;

at least one of said transverse elements of each of said pairs having a driving surface within the respective recess, at least a portion of said driving surface extending downwardly toward the bottom surface and in the direction of intended travel, said driving surfaces of said transverse elements being planar;

said first and second pluralities of link ends and said intermediate structure being an integral structure of molded plastic material.

100. A module for constructing a linked conveyor belt capable of being driven by sprockets in at least one direction of intended travel, said module having a width, a conveying surface and a bottom surface, and comprising:

a first plurality of link ends;

a second plurality of ink ends;

at least some of said first and second pluralities of link ends being formed to circumscribe a pivot hole;

the pivot holes of each plurality of link ends being aligned on respective first and second substantially parallel pivot axes;

an intermediate structure integral with and connecting the first and second pluralities of link ends;

said intermediate structure having at least two transverse elements extending at least partially across the width of the module and substantially parallel to the pivot axes; and, a plurality of longitudinal members integral with and intersecting said transverse elements, said at least two transverse elements and said longitudinal members defining at least two sprocket recesses extending from the bottom surface toward the conveying surface and capable of receiving cooperative sprocket teeth;

said at least two transverse elements having a driving surface within said sprocket recesses and at least a portion of each of said driving surfaces extending downwardly toward the bottom surface and in the direction of intended travel;

said intermediate structure including at least one cross member extending across the width of the module and at least two of said transverse elements comprising portions of said at least one cross member;

said first and second pluralities of link ends and said intermediate structure being an integral structure of molded plastic material.

101. A module for constructing a linked conveyor belt capable of being driven by sprockets in at least one direction of intended travel said module having a width, a conveying surface, and a bottom surface, and comprising:

a first plurality of link ends;

a second plurality of link ends;

at least one of said first and second pluralities of link ends being formed to circumscribe a pivot hole;

the pivot holes of each plurality of link ends being aligned on respective first and second substantially prallel pivot axes;

an intermediate structure integral with and connecting the first and second pluralities of link ends;

said intermediate structure having at least two pairs of opposing transverse elements extending in a direction substantially parallel to the pivot axes, each of said elements extending at least partially across said width; and, a plurality of longitudinal members between the sides of the module intersecting the transverse elements;

said transverse members and selected ones of said longitudinal members defining at least two recesses extending from the bottom surface toward the conveying surface and capable of receiving cooperative sprocket teeth;

at least one of said transverse elements of each of said pairs having a driving surface within the respective recess, at least a portion of said driving surface extending downwardly toward the bottom surface and in the direction of intended travel;

said intermediate structure including at least one cross member extending across the width of the module and at least two of said transverse elements comprising portions of said at least one cross member;

said first and second pluralities of link ends and said intermediate structure being an integral structure of molded plastic material.

102. A module for constructing a linked conveyor belt capable of being driven by sprockets in at least one direction of intended travel, said module having a width, an upper conveying surface on which a product is conveyed, and a bottom surface, and comprising:

a first plurality of link ends;

a second plurality of link ends;
a surface of at least some of said link ends forming at least part of said upper conveying surface;
at least some of said first and second pluralities of link ends being formed to circumscribe a pivot hole;
the pivot holes of each plurality of link ends being aligned on respective first and second substantially parallel pivot axes;
an intermediate structure integral with and connecting the first and second pluralities of link ends;
said intermediate structure having at least two pairs of opposing transverse elements extending in a direction substantially parallel to the pivot axes, each of said elements extending at least partially across said width; and
a plurality of longitudinal members between the sides of the module intersecting the transverse elements;
said transverse members and selected ones of said longitudinal members defining at least two recesses extending from the bottom surface toward the conveying surface and capable of receiving cooperative sprocket teeth;
at least one of said transverse elements of each of said pairs having a driving surface within the respective recess, at least a portion of said driving surface extending downwardly toward the bottom surface and in the direction of intended travel;
said first and second pluralities of link ends and said intermediate structure being an integral structure of molded plastic material.

103. The module of claim 1 wherein a surface of at least some of said link ends form at least part of said upper conveying surface.

* * * * *